US011232457B1

(12) United States Patent
Li et al.

(10) Patent No.: US 11,232,457 B1
(45) Date of Patent: Jan. 25, 2022

(54) SYSTEMS AND METHODS FOR PROTECTING USERS

(71) Applicant: NORTONLIFELOCK INC., Tempe, AZ (US)

(72) Inventors: Qing Li, Cupertino, CA (US); Brian Varner, Polk City, FL (US); Stanley Kiefer, Navarre, FL (US); Daniel Kats, Culver City, CA (US); Yun Shen, Bristol (GB); David Silva, Dublin (IE)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/205,929

(22) Filed: Mar. 18, 2021

(51) Int. Cl.
*G06Q 30/00* (2012.01)
*G06F 16/23* (2019.01)
*H04W 12/61* (2021.01)
*G06Q 50/26* (2012.01)
*H04W 4/029* (2018.01)
*H04W 12/63* (2021.01)

(52) U.S. Cl.
CPC .......... *G06Q 30/018* (2013.01); *G06Q 50/26* (2013.01); *H04W 4/029* (2018.02); *H04W 12/61* (2021.01); *H04W 12/63* (2021.01); *G06F 16/2379* (2019.01)

(58) Field of Classification Search
CPC ..... G06Q 30/018; G06Q 50/26; H04W 4/029; H04W 12/63; H04W 12/61; G06F 16/2379
See application file for complete search history.

(56) References Cited

U.S. PATENT DOCUMENTS

| | | | |
|---|---|---|---|
| 8,502,674 B1* | 8/2013 | Cole | G08B 21/0266 340/572.4 |
| 2015/0147067 A1* | 5/2015 | Ryan | H04W 4/02 398/118 |
| 2015/0242768 A1* | 8/2015 | Gazdzinski | G06K 7/10297 705/5 |
| 2020/0288895 A1* | 9/2020 | Bennet | H04W 12/08 |

* cited by examiner

*Primary Examiner* — Joseph E Dean, Jr.
(74) *Attorney, Agent, or Firm* — FisherBroyles, LLP

(57) ABSTRACT

The disclosed computer-implemented method for protecting users may include (i) identifying a first light-and-radio frequency signature that was captured by a security device based on signals emanating from a mobile computing device at a first time and location, (ii) identifying a second light-and-radio frequency signature that was captured by a same or different security device based on signals emanating from the same mobile computing device at a second time and location, (iii) determining that the first light-and-radio frequency signature and the second light-and-radio frequency signature match such that an inference is made that an individual possessing the mobile computing device was present at both the first time and location and the second time and location, and (iv) performing, based on the inference, a security action to protect a user. Various other methods, systems, and computer-readable media are also disclosed.

20 Claims, 12 Drawing Sheets

SYSTEMS AND METHODS FOR PROTECTING USERS

BACKGROUND

In the modern e-commerce marketplace, customers of online retailers frequently order packages over the Internet, which are subsequently delivered to households through the mail. If an individual is not available to answer the door, then such packages may potentially be left on a porch area. Nevertheless, leaving the packages on the porch may render the packages vulnerable to theft. More generally, family members of a household may not always fully understand who is present or near the household or whether such individuals pose a security threat. To help address these problems and other problems, as discussed in more detail below, the present disclosure identifies and addresses a need for improved systems and methods for protecting users.

SUMMARY

As will be described in greater detail below, the present disclosure describes various systems and methods for protecting users. In one example, a computer-implemented method for protecting users may include (i) identifying a first light-and-radio frequency signature that was captured by a security device based on signals emanating from a mobile computing device at a first time and location, (ii) identifying a second light-and-radio frequency signature that was captured by a same or different security device based on signals emanating from the same mobile computing device at a second time and location, (iii) determining that the first light-and-radio frequency signature and the second light-and-radio frequency signature match such that an inference is made that an individual possessing the mobile computing device was present at both the first time and location and the second time and location, and (iv) performing, based on the inference that the individual possessing the mobile computing device was present at both the first time and location and the second time and location, a security action to protect a user.

In one embodiment, the second light-and-radio frequency signature was captured by a different security device than the security device that captured the first light-and-radio frequency signature. In one embodiment, the security device and the different security device are provided by the same cybersecurity vendor. In one embodiment, the security device and the different security device correspond to different purchases from customers belonging to different households. In one embodiment, the same security device captures both the first light-and-radio frequency signature and the second light-and-radio frequency signature.

In some examples, determining that the first light-and-radio frequency signature and the second light-and-radio frequency signature match may include checking the first light-and-radio frequency signature against a database cache that is local to the security device. In one embodiment, the first light-and-radio frequency signature or the second light-and-radio frequency signature is uploaded to a centralized data lake of signatures to share insights between customers of a same cybersecurity vendor.

In some examples, the computer-implemented method may further include prompting the user to indicate whether the individual possessing the mobile computing device is known to the user. In one embodiment, the computer-implemented method may further include, upon a subsequent detection of the individual possessing the mobile computing device, alerting the user to the presence of the individual based on an indication that the individual is not known to the user.

In one embodiment, the computer-implemented method may further include the security device capturing evidence of a crime. In one embodiment, the computer-implemented method may further include the security device submitting the evidence of the crime to law enforcement.

In some examples, the computer-implemented method may further include leveraging the first light-and-radio frequency signature and the second light-and-radio frequency signature to track movement of the individual possessing the mobile computing device across a local area. In one embodiment, the first light-and-radio frequency signature is based at least in part on a Bluetooth advertisement or a Wi-Fi probe request. In one embodiment, the first light-and-radio frequency signature is generated based on a combination of multiple underlying signatures across distinct wavelengths.

In some examples, the computer-implemented method may further include prompting the user with an option to enroll the first light-and-radio frequency signature to a centralized data lake maintained by a cybersecurity vendor that provided the security device such that cybersecurity insights associated with the first light-and-radio frequency signature are shared with other customers. In some examples, the computer-implemented method may further include uploading the first light-and-radio frequency signature to the centralized data lake using a customized application programming interface.

In some examples, the computer-implemented method may further include sanitizing the first light-and-radio frequency signature in a manner that increases a level of privacy for the individual possessing the mobile computing device while nevertheless maintaining a level of cybersecurity protection. In some examples, sanitizing the first light-and-radio frequency signature may include limiting the first light-and-radio frequency signature to a textual tag in combination with information specifying captured electromagnetic emanations.

In one embodiment, a system for implementing the above-described method may include (i) an identification module, stored in memory, that identifies a first light-and-radio frequency signature that was captured by a security device based on signals emanating from a mobile computing device at a first time and location, (ii) where the identification module identifies a second light-and-radio frequency signature that was captured by a same or different security device based on signals emanating from the same mobile computing device at a second time and location, (iii) a determination module, stored in memory, that determines that the first light-and-radio frequency signature and the second light-and-radio frequency signature match such that an inference is made that an individual possessing the mobile computing device was present at both the first time and location and the second time and location, (iv) a performance module, stored in memory, that performs, based on the inference that the individual possessing the mobile computing device was present at both the first time and location and the second time and location, a security action to protect a user, and (v) at least one physical processor configured to execute the identification module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a first light-and-radio frequency signature that was captured by a security device based on signals emanating from a mobile computing device at a first time and location, (ii) identify a second light-and-radio frequency signature that was captured by a same or different security device based on signals emanating from the same mobile computing device at a second time and location, (iii) determine that the first light-and-radio frequency signature and the second light-and-radio frequency signature match such that an inference is made that an individual possessing the mobile computing device was present at both the first time and location and the second time and location, and (iv) perform, based on the inference that the individual possessing the mobile computing device was present at both the first time and location and the second time and location, a security action to protect a user.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
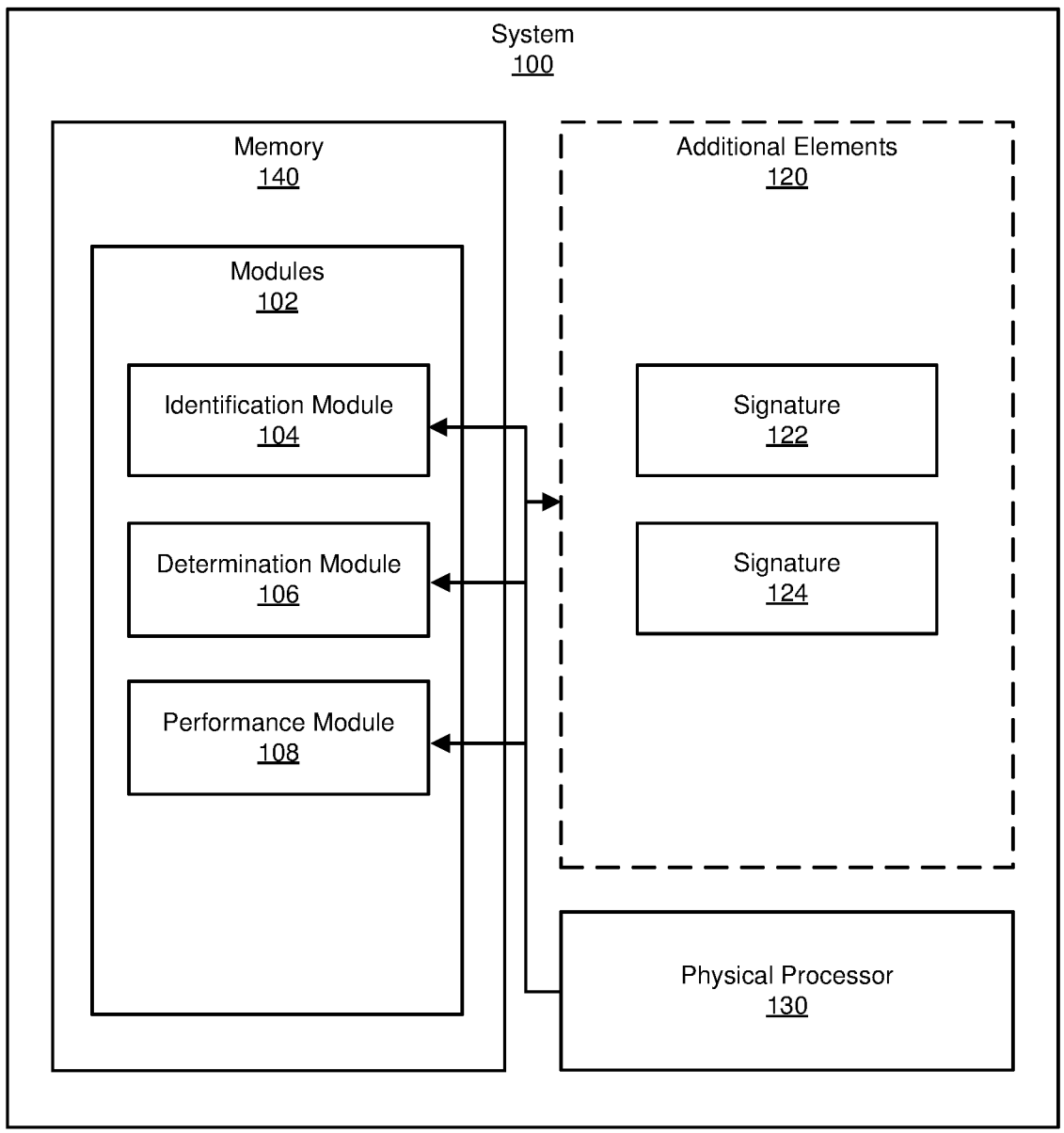
FIG. 1 is a block diagram of an example system for protecting users.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting users. The technology disclosed in this application may improve upon other systems by adding a crowdsourcing-type feature to a home or business cybersecurity device that tracks individuals and corresponding devices through signatures of electromagnetic emissions. Accordingly, the technology may automate the process of identifying individuals near or present at a household, and the technology may furthermore ascertain whether such individuals pose a security threat. The technology may also share the insights and results from these cybersecurity procedures with other users or customers, as discussed in more detail below.

Figure 2:
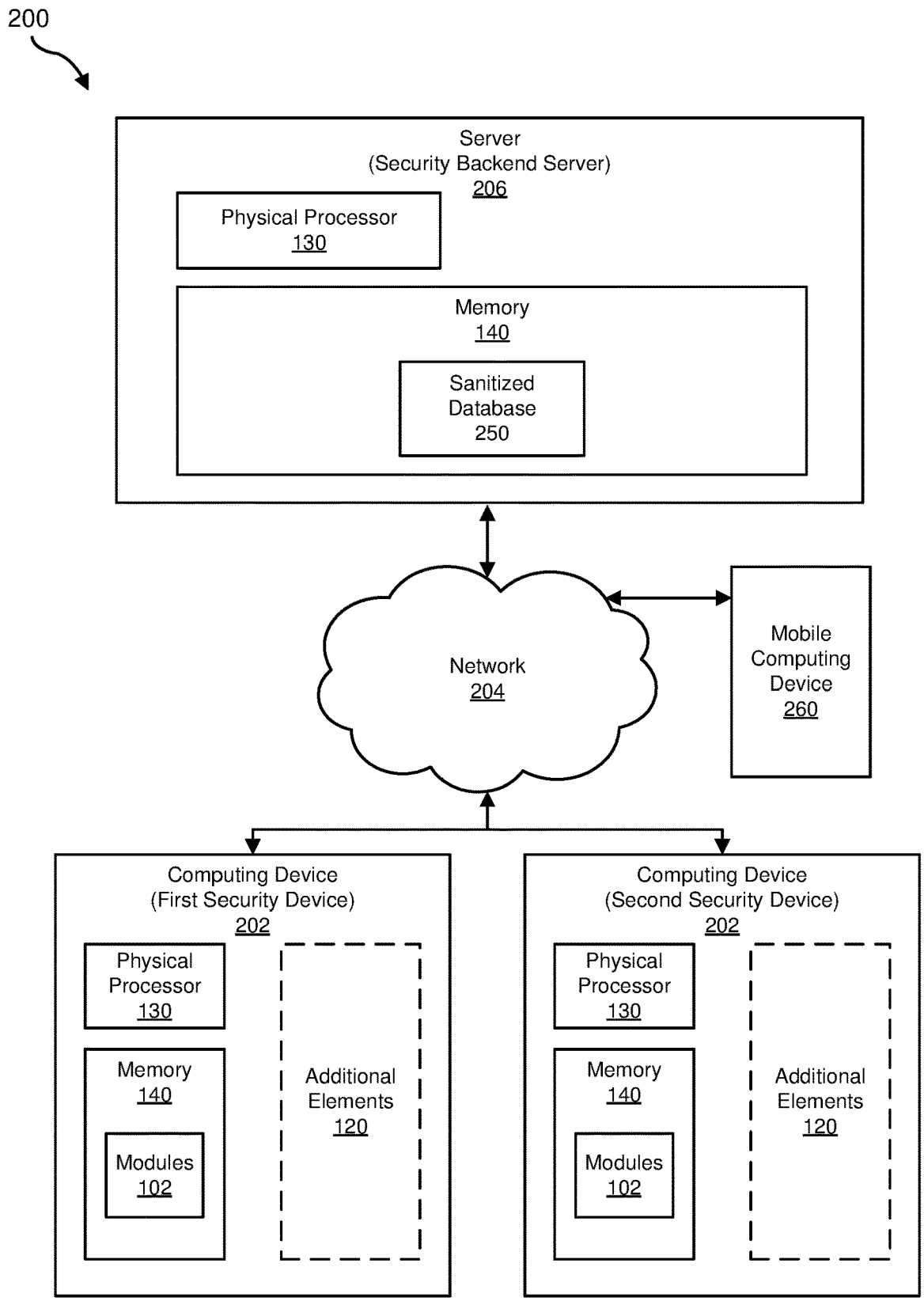
FIG. 2 is a block diagram of an additional example system for protecting users.

The following will provide, with reference to FIGS. 1-2, detailed descriptions of example systems for protecting users. Detailed descriptions of corresponding computer-implemented methods will also be provided in connection with FIGS. 3-10. In addition, detailed descriptions of an example computing system and network architecture capable of implementing one or more of the embodiments described herein will be provided in connection with FIGS. 11 and 12, respectively.

FIG. 1 is a block diagram of example system 100 for protecting users. As illustrated in this figure, example system 100 may include one or more modules 102 for performing one or more tasks. For example, and as will be explained in greater detail below, example system 100 may include an identification module 104 that identifies a signature 122 that was captured by a security device based on signals emanating from a mobile computing device at a first time and location. Identification module 104 may also identify signature 124 that was captured by the same security device or a different security device based on signals emanating from the same mobile computing device at a second time and location. Example system 100 may additionally include a determination module 106 that determines that the two signatures match such that an inference is made that an individual possessing the mobile computing device was present at both the first time and location and the second time and location. Example system 100 may also include a performance module 108 that performs, based on the inference that the individual possessing the mobile computing device was present at both the first time and location and the second time and location, a security action to protect a user. Signature 122 and signature 124 may be stored within additional elements 120. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

For example, and as will be described in greater detail below, identification module 104 may identify signature 122 that was captured by an instance of computing device 202 (e.g., "first security device" in FIG. 2) based on signals emanating from a mobile computing device 260 at a first time and location. Identification module 104 may identify signature 124 that was captured by a same or different security device (e.g., "second security device" in FIG. 2) based on signals emanating from the same mobile computing device 260 at a second time and location. Determination module 106 may determine that the two signatures match such that an inference is made that an individual possessing mobile computing device 260 was present at both the first time and location and the second time and location. Performance module 108 may perform, based on the inference that the individual possessing mobile computing device 260 was present at both the first time and location and the second time and location, a security action to protect a user (e.g., a customer who purchased the first security device or the second security device). This figure also illustrates how the first security device and the second security device may interface with a server 206, which may correspond to a security backend server, and which provides a sanitized database 250, as discussed in more detail below.

Figure 3:
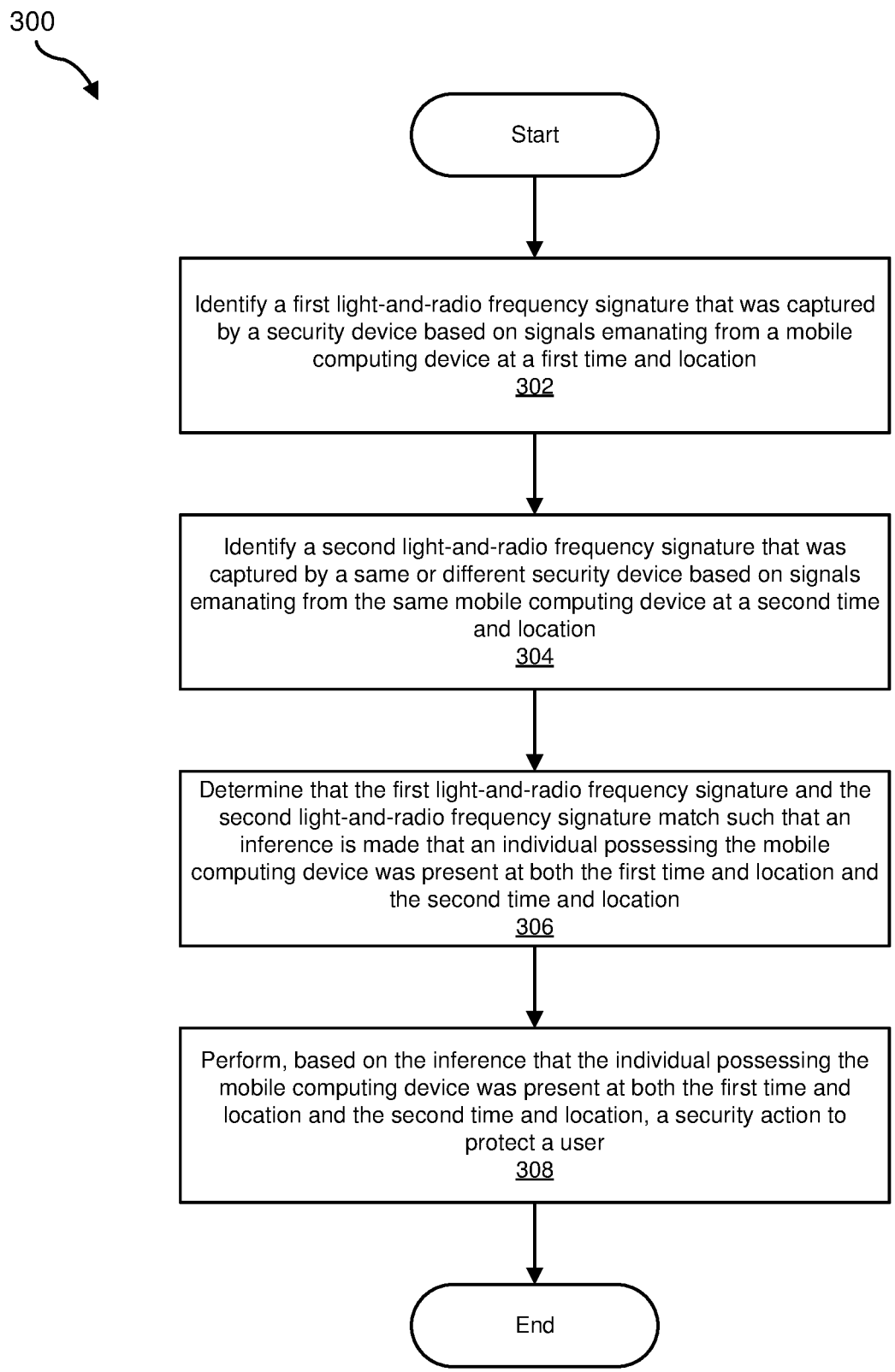
FIG. 3 is a flow diagram of an example method for protecting users.

Computing device 202 generally represents any type or form of computing device capable of facilitating the performance of method 300 of FIG. 3. Generally speaking, computing device 202 may be equipped with a radio and configuration that receives, processes, and analyzes a range of electromagnetic wave information, including light or optical wavelengths as well as radio wavelengths, and as discussed in more detail below. Additional examples of computing device 202 include, without limitation, devices that are equipped with such a radio, including potentially laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of functioning as a centralized backend security server, as discussed in more detail below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for protecting users. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a first light-and-radio frequency signature that was captured by a security device based on signals emanating from a mobile computing device at a first time and location. For example, identification module 104 may, as part of computing device 202 in FIG. 2, identify signature 122 that was captured by the first security device based on signals emanating from mobile computing device 260 at a first time and location.

Identification module 104 may perform step 302 in a variety of ways. As used herein, the term "light-and-radio frequency signature" generally refers to an overall signature based on an analysis of how the mobile computing device is emanating electromagnetic frequencies along both the light wavelengths and the radio wavelengths. Thus, the overall signature may be based on a combination of underlying signatures, including a light wavelength signature and a radio wavelengths signature. Additionally, the overall signature may also be based on signatures at the microwave, infrared, ultraviolet, x-ray, and/or gamma ray frequencies. In alternative embodiments, the overall signature may be based on microwave, infrared, ultraviolet, x-ray, and/or gamma ray frequencies, without necessarily being based on either or both of light wavelength signatures or radio wavelength signatures. In some illustrative examples, the signatures may be based at least in part on a Bluetooth advertisement or a Wi-Fi probe request. The signatures may indicate a particular setting, software, and/or hardware configuration of the corresponding mobile computing device, which is sufficient to facilitate or provide a device signature. For example, the signatures may reflect how different devices are configured, in software or hardware, in different manners. The signatures may also optionally reflect natural variations or imperfections in hardware manufacturing.

Moreover, as used herein, the term "security device" generally refers to an Internet or wide-area-network connected security device provided by a security vendor to protect a corresponding local area, such as a household or corporate business campus, by monitoring the local area for electromagnetic emissions to identify and categorize individuals and corresponding movements. Furthermore, as used herein, the term "security device" generally refers to devices that are configured to share over a network, with at least one other device, one or more items of information describing detections of electromagnetic emissions in accordance with method 300, as discussed in more detail below.

Figure 4:
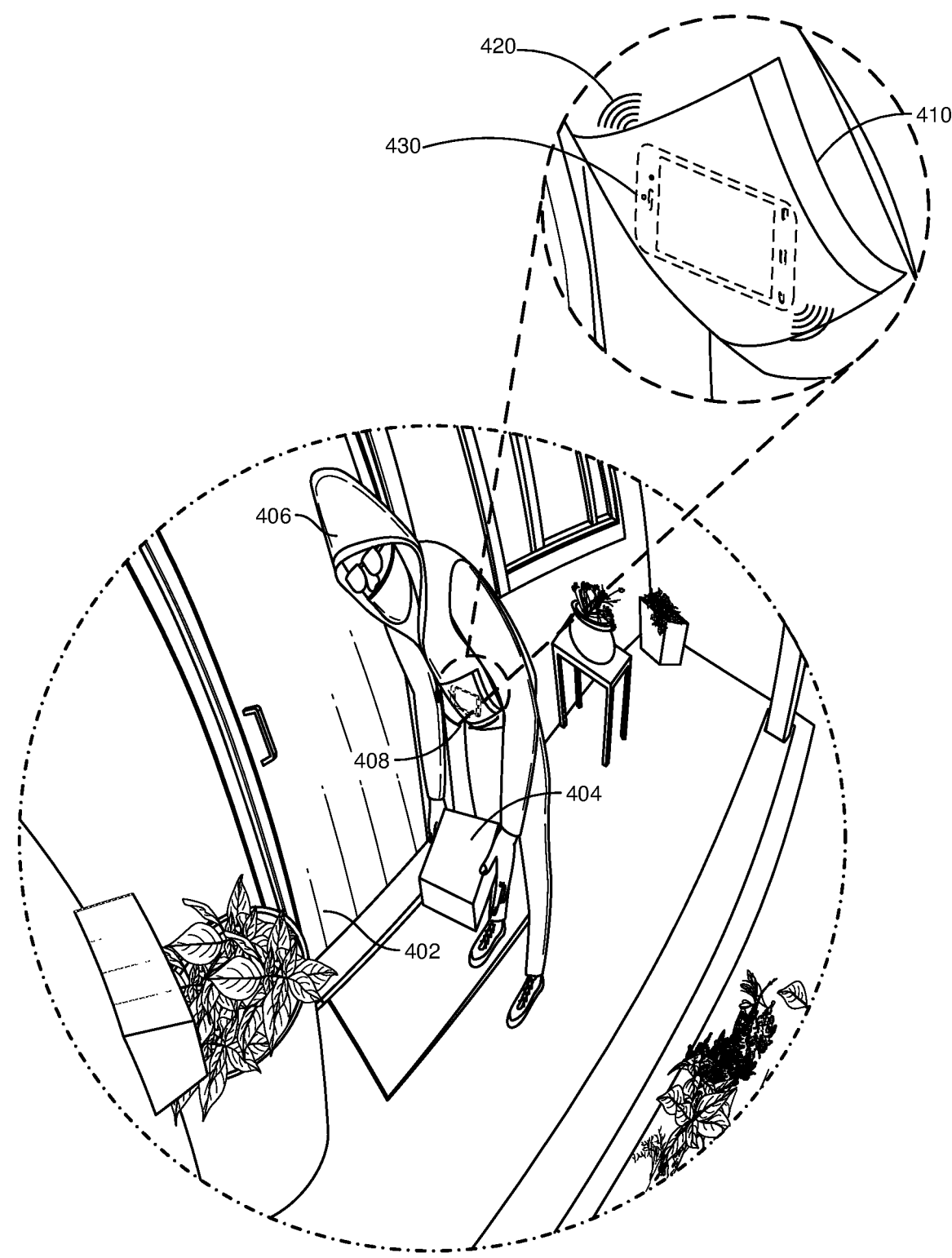
FIG. 4 is a diagram of a porch pirate.

FIG. 4 shows an illustrative example of a criminal 406 stealing a package 404 near door 402 on the porch of a household within a suburban neighborhood. The circular picture captured here may have been captured by a security device, such as the security devices shown in FIG. 2 and discussed in more detail below regarding FIG. 6. FIG. 4 also focuses on a callout 408 on the front pocket 410 within a sweatshirt that criminal 406 is wearing. The pocket holds a smartphone 430, which may correspond to mobile computing device 260, and which may be emanating electromagnetic emissions, as indicated by an indicator 420. Identification module 104 may detect and/or identify signature 122 based on these emissions At step 304, one or more of the systems described herein may identify a second light-and-radio frequency signature that was captured by a same or different security device based on signals emanating from the same mobile computing device at a second time and location. For example, identification module 104 may, as part of computing device 202 in FIG. 2, identify signature 124 that was captured by a same or different security device based on signals emanating from the same mobile computing device 260 at a second time and location.

Identification module 104 may perform step 304 in a variety of ways. In one embodiment, the second light-and-radio frequency signature was captured by a different security device than the security device that captured the first light-and-radio frequency signature. Returning to FIG. 2, the different security device may correspond to the second security device or second instance of computing device 202. In some examples, the two security devices may be provided by the same cybersecurity vendor. In other examples, the two security devices may be provided by different vendors. In some examples, the security device and the different security device correspond to different purchases from customers belonging to different households. Thus, a father of one household within a neighborhood may have purchased one of the security devices to protect that household, whereas a mother of another household within the same neighborhood may have purchased another security device, from the same or different vendor, to protect her household.

Figure 5:
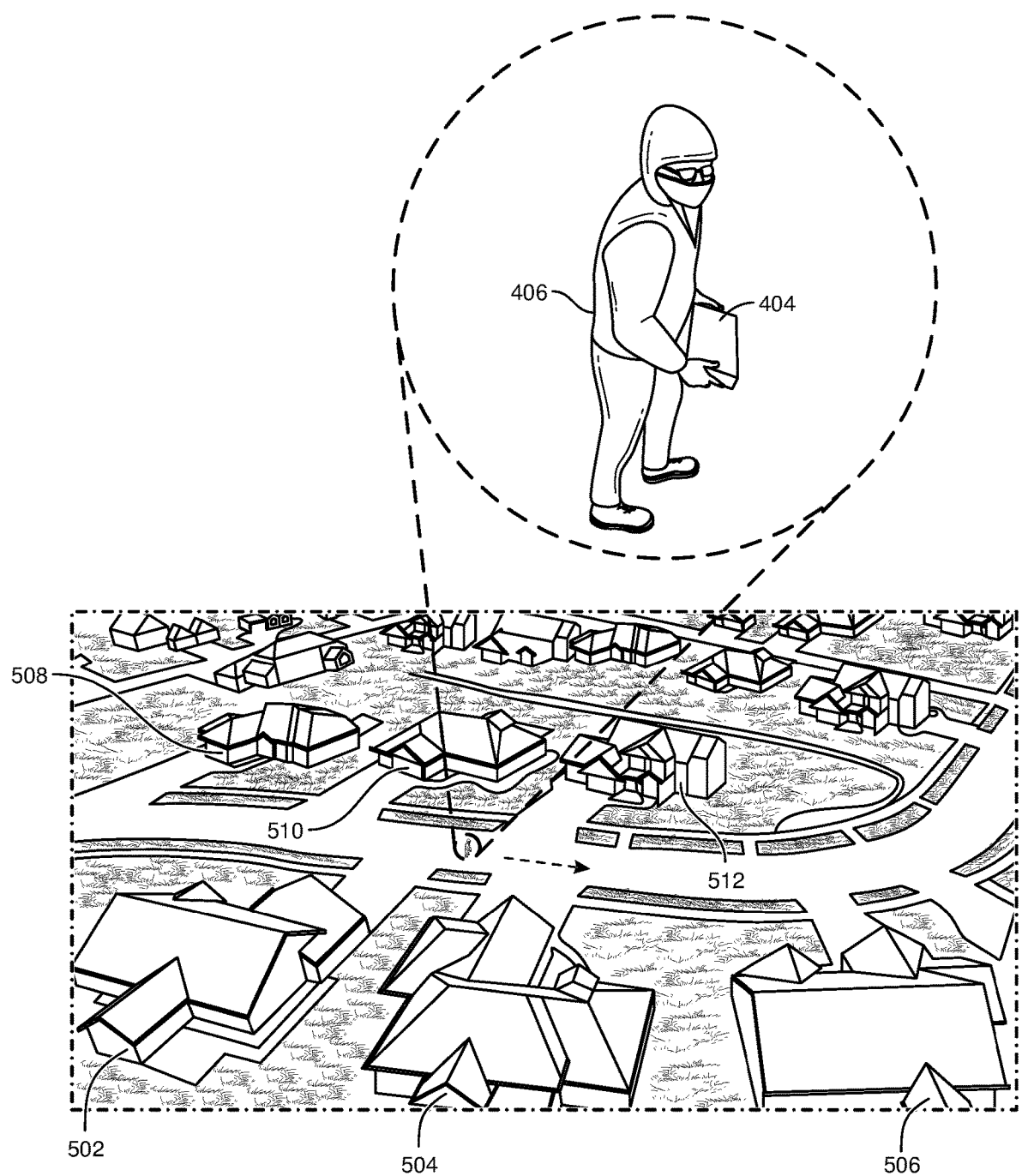
FIG. 5 is a diagram of the porch pirate moving through a neighborhood.

In some examples, the systems described herein may leverage the first light-and-radio frequency signature and the second light-and-radio frequency signature to track movement of the individual possessing the mobile computing device across a local area. To help illustrate this feature, FIG. 5 shows an example of a suburban neighborhood that includes a house 502, a house 504, a house 506, a house 508, a house 510, and a house 512. The callout of this figure further illustrates how criminal 406 may be carrying package 404 along a route from house 510 to house 512. Thus, in the context of method 300, step 302 may have been performed in connection with house 510 where the criminal first stole one package, and then step 304 may have been performed in connection with house 512, where the criminal may subsequently attempt to steal another package. In these examples, steps 302 and 304 may be performed by the first security device, the second security device, and/or server 206, as appropriate, to achieve the intended benefits of method 300.

Figure 6:
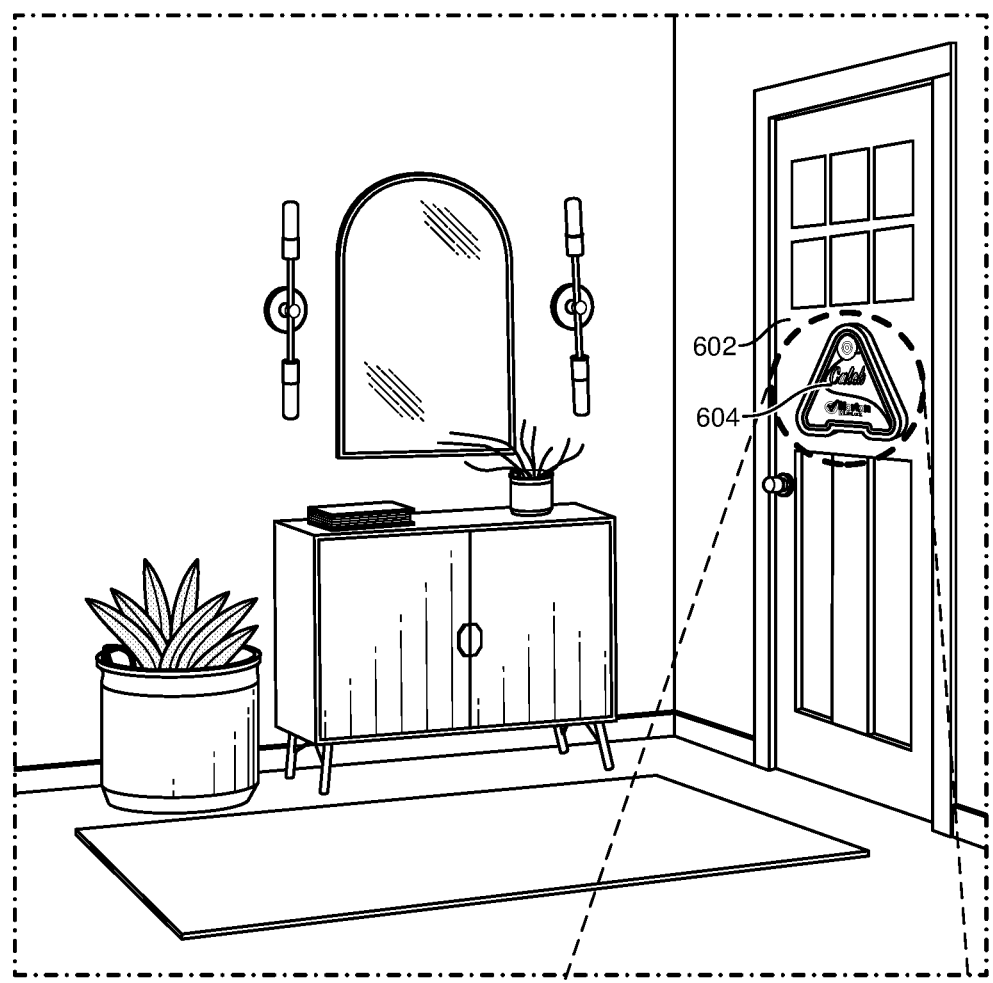
FIG. 6 is a diagram of a home security device.
Figure 6:
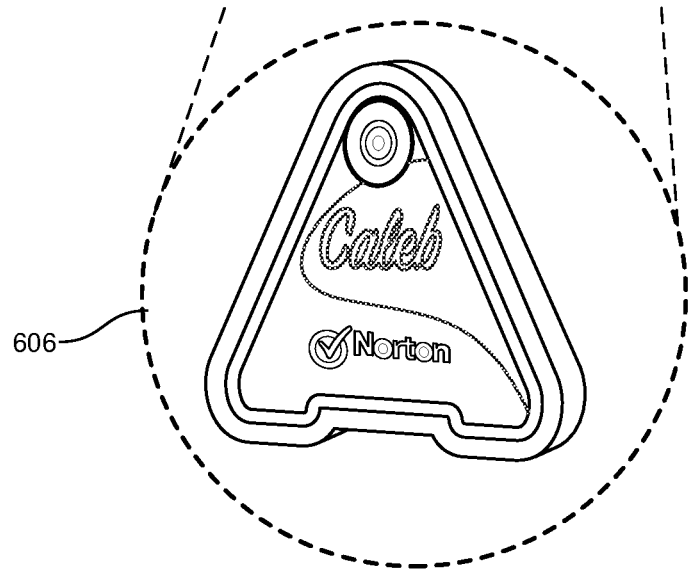

In other examples, the two security devices may belong to the same household. For example, one security device may be placed in the living room, and another security device may be placed in another room, such as a bedroom. As one illustrative example, FIG. 6 shows an instance of the security device 604, which is affixed to a door 602. The security device may optionally have a triangular shape. More detail regarding the configuration of the security device is shown within a zoomed-in callout 606 in this figure.

Alternatively, in some examples, the same security device captures both the first light-and-radio frequency signature and the second light-and-radio frequency signature. As one illustrative example, in the context of FIG. 4, the same security device monitoring the porch of a household may capture a first photograph and first identifier of electromagnetic emissions at a first time, and then may subsequently capture a second photograph and second identifier of electromagnetic emissions.

At step 306, one or more of the systems described herein may determine that the first light-and-radio frequency signature and the second light-and-radio frequency signature match such that an inference is made that an individual possessing the mobile computing device was present at both the first time and location and the second time and location. For example, determination module 106 may, as part of computing device 202 in FIG. 2, determine that signature 122 and signature 124 match such that an inference is made that an individual possessing the mobile computing device 260 was present at both the first time and location and the second time and location.

Determination module 106 may perform step 306 in a variety of ways. Generally speaking, determination module 106 may perform step 306 at least in part by measuring a level of similarity between signature 122 and signature 124 and furthermore determining that the level of similarity satisfies one or more thresholds. For example, determination module 106 may measure a level of similarity between an overall signature and another overall signature. In particular, determination module 106 may measure levels of similarity between respective underlying signatures, such as levels of similarity between respective optical lightwave signatures and levels of similarity between respective radio frequency signatures. Determination module 106 may then optionally base the measurement of similarity between the overall signatures as a combination of, or function of, the multiple measurements of similarity between underlying signatures.

In some examples, determination module 106 may determine that the first light-and-radio frequency signature and the second light-and-radio frequency signature match by checking the first light-and-radio frequency signature against a database cache that is local to the security device. For example, the database cache may be stored within memory 140 of modules 102 in the first security device shown in FIG. 2. The database cache may store signatures that were previously encountered by the same security device. These signatures may optionally have been uploaded to server 206, or optionally maintained privately within the database cache and without uploading to server 206, based on the preference of a user or administrator, as discussed in more detail below. More specifically, the first light-and-radio frequency signature or the second light-and-radio frequency signature may have been uploaded to a centralized data lake of signatures, which may correspond to a sanitized database 250 shown in FIG. 2, to share insights between customers of a same cybersecurity vendor. For example, a customer who purchased the first security device of FIG. 2 may upload a corresponding signature to sanitized database 250, and subsequently the second security device shown in FIG. 2 may benefit by accessing the uploaded signature and/or by receiving a customized security action instruction from server 206, where the customized security action is tailored to an insight gained from the use of the uploaded signature. In further examples, determination module 106 or performance module 108 may optionally upload the first light-and-radio frequency signature or the second light-and-radio frequency signature to the centralized data lake using a customized application programming interface.

Figure 7:
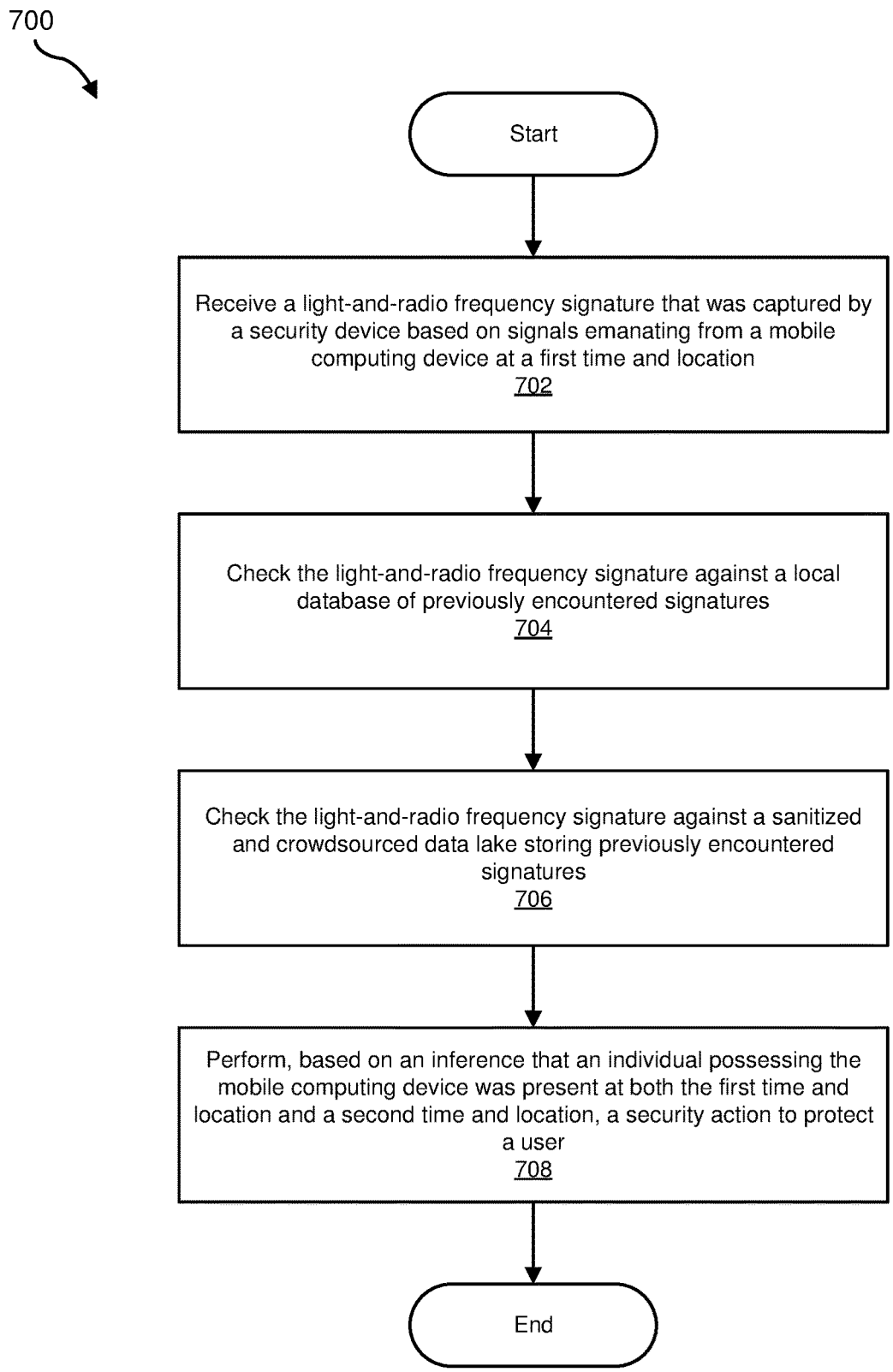
FIG. 7 is a flow diagram of another example method for protecting users.

FIG. 7 shows an example flow diagram 700 that corresponds to one embodiment for determining that signature 122 and signature 124 match. As further shown in this figure, the flow diagram may begin at a step 702, which may generally parallel step 302. In response, at step 704, determination module 106 may check signature 122 against a local database of previously encountered signatures. Returning to the example of FIG. 4, upon detecting the presence of the criminal on the porch of the household, the corresponding security device may further check its local database to determine whether the criminal has previously been detected at this specific location on the porch. At step 704, the security device may be essentially limited to checking a currently-encountered identifier of electromagnetic emissions against other identifiers that the same security device has previously encountered. To supplement this checking process, at step 706, the security device may further check signature 122 against a sanitized and/or crowdsourced data lake storing previously encountered signatures. Thus, in contrast to step 704, at step 706, the security device capturing the photograph and/or electromagnetic emissions of the criminal on the porch may benefit, not just from previous detections by the same security device, but also from additional detections by other security devices that similarly contribute to the same data lake. The data lake may correspond to server 206 of FIG. 2, as further discussed above. Lastly, at step 708, performance module 108 may perform a customized security action, or may instruct a customized security action, to protect the user based on the insights gained in the performance of step 704 and/or step 706, as discussed in more detail below. This performance step may be performed by the first security device, the second security device, and/or server 206.

Figure 8:
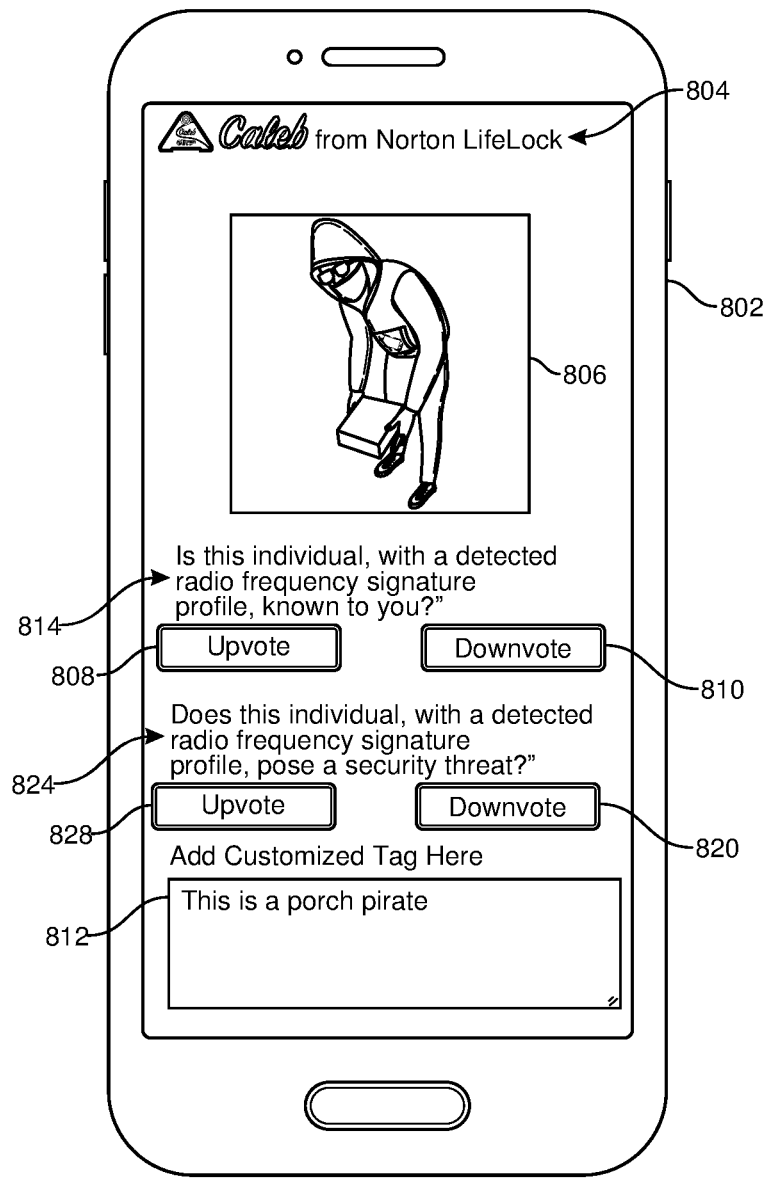
FIGS. 8-10 are diagrams of a smartphone GUI display showing an application that facilitates the method for protecting users.

FIG. 8 shows a diagram of a smartphone 802, which displays a graphical user interface for a cybersecurity application that may facilitate the performance of method 300. As further shown in this figure, the display of the application within the user interface may include a headline 804, which may specify a product name and/or vendor for the corresponding application. This application may also display an instance of a photograph 806, which may correspond to the photograph captured by the security device in FIG. 4, together with the capturing of information specifying or identifying the electromagnetic emissions. Thus, the user or customer corresponding to the security device of FIG. 4 may leverage this application to provide input to the security device. Along these lines, the application may include an optional prompt 814, which may request for the user to indicate whether the individual in the photograph is known to the user. The user may respond by clicking a corresponding upvote button 808 or a downvote button 810. The application may also include an optional prompt 824, which may request for the user to indicate whether the user regards the individual in the photograph as representing a security threat. The user may respond using any suitable input, including, for example, toggling an upvote button 828 or a downvote button 820. Because the individual in this example is a criminal, and a porch pirate, the user of the security device may appropriately click upvote button 828. Lastly, the user interface for this application also provides an input area 812, where the user can input a textual tag to help identify and/or classify the individual shown in photograph 806.

Figure 9:
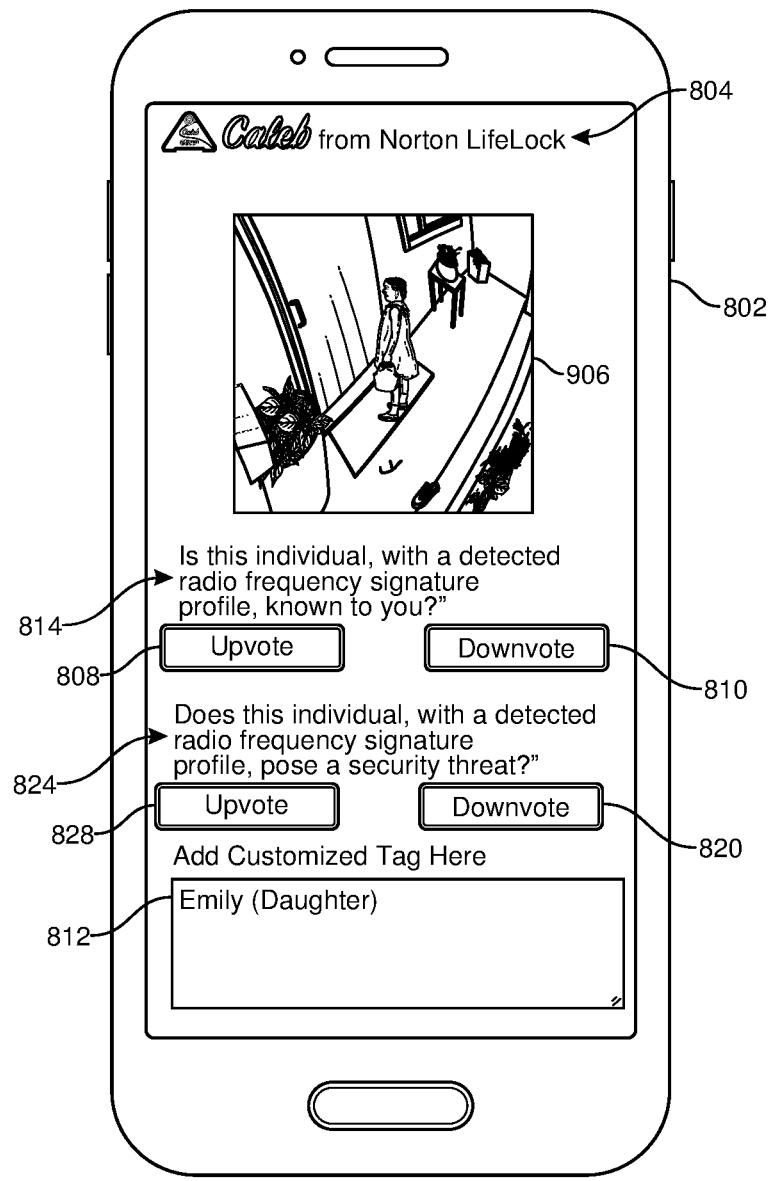

In contrast to the example of FIG. 8, which is directed to the detection of the criminal on the porch, FIG. 9 shows a corresponding graphical user interface for entering input regarding the detection of an innocent or benign individual who does not pose a security threat. In particular, the same graphical user interface now displays a photograph 906 of a small girl with a lunch box before the door on the porch. The same graphical user interface may also include the same prompt 814 and prompt 824. Because the user in this example is innocent and does not pose a security threat, the user may optionally toggle downvote button 820 to indicate that the individual is not a security threat. Similarly, within input area 812, the user may enter a tag that specifies the individual's name (i.e., "Emily"), and furthermore optionally specifies that the individual is the daughter of the user of the security device.

Figure 10:
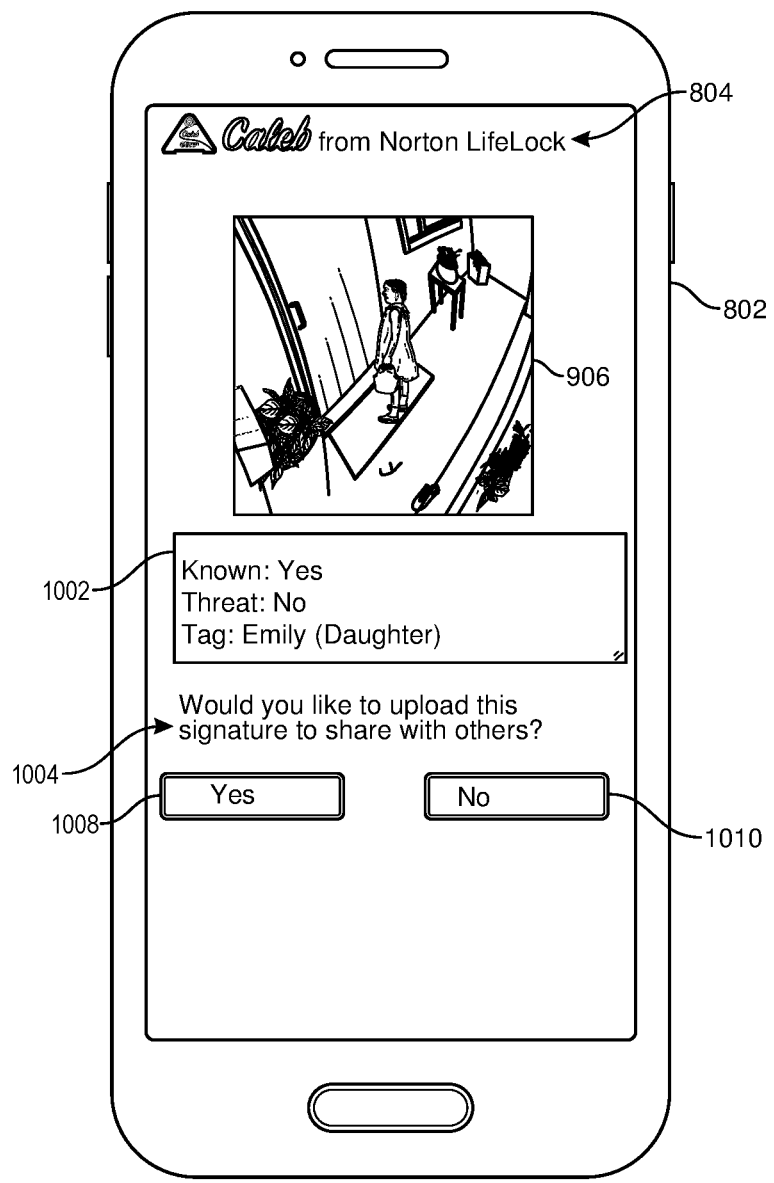

As further discussed above, the systems described herein may also provide an opportunity for the user or administrator of the security device to upload the generated signature from step 302 and/or step 304 to a centralized data lake for the benefit of other customers or users. FIG. 10 shows another example of the graphical user interface, which may enable the user to elect whether to enroll one or more signatures into the centralized data lake for the benefit of others. As further shown in this figure, a signature 1002 may optionally include one or more of the following items of information: (i) the underlying specifications of the electromagnetic emissions (not shown in FIG. 10), (ii) the indication from the user uploading the signature of whether the individual in the photograph is known to the user, (iii) the indication from the user uploading the signature of whether the individual in the photograph does not pose a security threat, and/or (iv) a textual tag that describes the individual in the photograph, such as the textual tag previously discussed in connection with FIG. 9.

In the example of FIG. 10, the individual in the photograph 906 is the same innocent girl who does not pose a security threat that was discussed above in connection with FIG. 9. For that reason, the user may optionally toggle a "No" button 1010 in response to a prompt 104, which requests for the user to indicate whether the user would like to upload this particular signature to the centralized data lake. This will help protect the privacy of the user and the innocent girl, because there is no particular reason why other members of other households should identify this individual through detected electromagnetic emissions. In contrast, the same user of the security device may toggle a "Yes" button 1008 to upload the signature corresponding to the criminal of FIGS. 4-5, because there is a clear interest in other customers or members of the neighborhood in taking preventive action to protect themselves from the criminal as he roams throughout the neighborhood.

Even in the case of the criminal, however, modules 102 may generally (but optionally) sanitize the signature by filtering or omitting one or more items of information from the signature prior to uploading to the centralized data lake. For example, the signature for the criminal may only include one or more of these: (i) the fingerprint of electromagnetic emissions, (ii) the photograph, and/or (iii) the customized tag discussed in connection with FIGS. 8-9. The signature may thereby optionally omit the criminal's name, Social Security number, device hardware identifier, device model number or serial number, driver's license number, telephone number, or any other personally identifiable information revealing information beyond the items of information listed above, thereby helping to mitigate any privacy concerns that may be raised by the performance of method 300.

At step 308, one or more of the systems described herein may perform, based on the inference that the individual possessing the mobile computing device was present at both the first time and location and the second time and location, a security action to protect a user. For example, performance module 108 may, as part of computing device 202 in FIG. 2, perform, based on the inference that the individual possessing mobile computing device 260 was present at both the first time and location and the second time and location, a security action to protect a user.

Performance module 108 may perform step 308 in a variety of ways. Generally speaking, performance module 108 may perform any suitable security action that increases a level of protection of the user from a corresponding security threat predicted or suggested by the performance of method 300. For example, performance module 108 may operate server-side at server 206 to perform the security action by instructing the first security device or the second security device to perform a supplemental security action. In other examples, performance module 108 may operate directly on the security device to perform the security action. Illustrative examples of such actions may include: (i) capturing additional evidence, whether in terms of photographic information, microphone information, and/or electromagnetic emissions information, (ii) alerting a user or administrator of the same security device performing step 302 and/or step 304, (iii) alerting another user or administrator of a different security device that contributes to the shared data lake, (iv) notifying or submitting evidence to one or more authorities, including law enforcement, (v) sounding an alert or alarm in an attempt to scare away a security threat or criminal, (vi) locking one or more doors, (vii) sounding a loud alert to notify any individuals within the nearby vicinity, whether those individuals pose a security threat or not, about the detected security threat (e.g., an alarm so loud that both the detected criminal and household family members can hear). Alerts regarding potential security threats, based on insights gained from the performance of method 300, may be transmitted through any suitable mechanism, including a network message, email, short service message, video message, web-based forum message, pop-up notification, and/or mobile device application notification.

In one illustrative example, performance module 108 may, upon a subsequent detection of the individual possessing the mobile computing device, alert the user to the presence of the individual based on an indication that the individual is not known to the user. In the example of FIG. 8, the user may indicate that the user does not know the criminal shown in photograph 806 upon the first time that the criminal is detected on the porch. Accordingly, upon a subsequent detection of the criminal on the porch, the security device may transmit an appropriate alert or notification to the user, administrator, or corresponding protected members (e.g., family members) that the administrator has previously identified. In particular, in one embodiment, modules 108 may capture or receive evidence of a crime. Additionally, performance module 108 may perform the security action at least in part by submitting the evidence of the crime to law enforcement.

Figure 11:
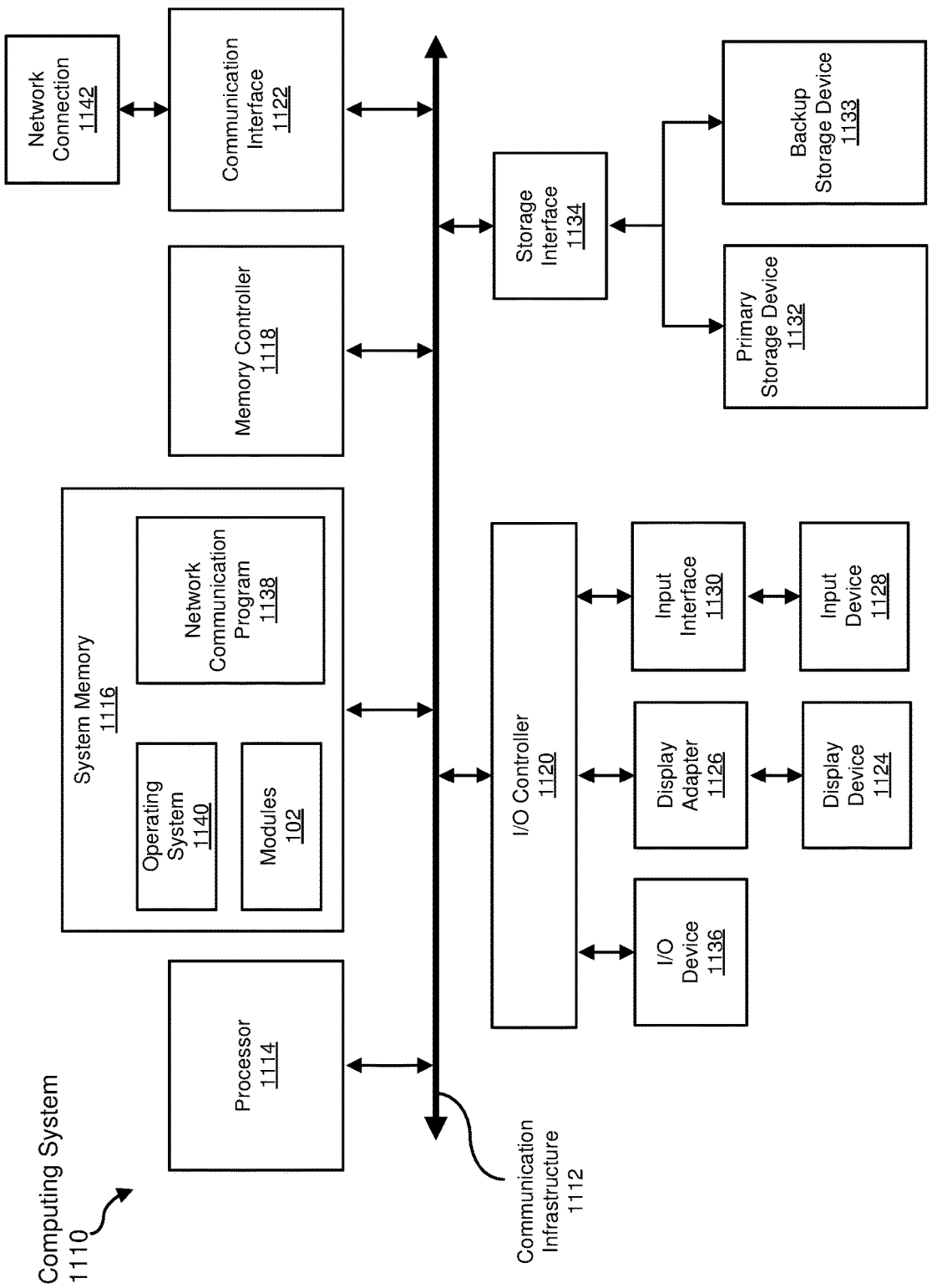
FIG. 11 is a block diagram of an example computing system capable of implementing one or more of the embodiments described and/or illustrated herein.

FIG. 11 is a block diagram of an example computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the example embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110. Examples of operating system 1140 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, example computing system 1110 may also include at least one input device 1128 coupled to I/O controller 1120 via an input interface 1130. Input device 1128 generally represents any type or form of input device capable of providing input, either computer or human generated, to example computing system 1110. Examples of input device 1128 include, without limitation, a keyboard, a pointing device, a speech recognition device, variations or combinations of one or more of the same, and/or any other input device.

Additionally or alternatively, example computing system 1110 may include additional I/O devices. For example, example computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between example computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or Application Specific Integrated Circuit (ASIC) incorporated in communication interface 1122.

As illustrated in FIG. 11, example computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1110 may be configured as an Application Specific Integrated Circuit (ASIC) adapted to implement one or more of the example embodiments disclosed herein.

Figure 12:
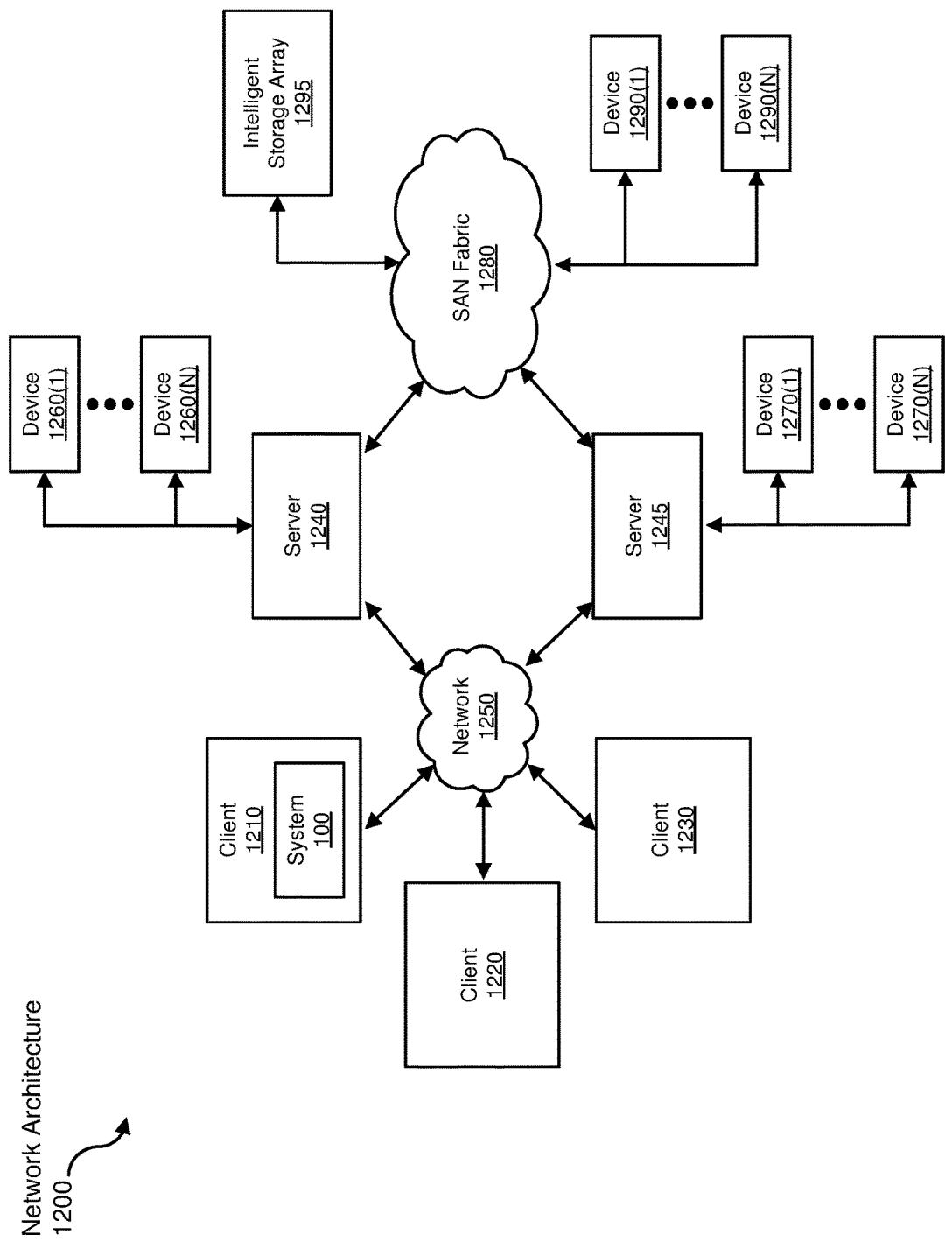
FIG. 12 is a block diagram of an example computing network capable of implementing one or more of the embodiments described and/or illustrated herein.

FIG. 12 is a block diagram of an example network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the present disclosure.

Client systems 1210, 1220, and 1230 generally represent any type or form of computing device or system, such as example computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to example computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the example embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an example method for protecting users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting users, at least a portion of the method being performed by a computing device comprising at least one processor, the method comprising:
    identifying a first light-and-radio frequency signature that was captured by a security device based on signals emanating from a mobile computing device at a first time and location;
    identifying a second light-and-radio frequency signature that was captured by a same or different security device based on signals emanating from the same mobile computing device at a second time and location;
    determining that the first light-and-radio frequency signature and the second light-and-radio frequency signature match such that an inference is made that an individual possessing the mobile computing device was present at both the first time and location and the second time and location; and
    performing, based on the inference that the individual possessing the mobile computing device was present at both the first time and location and the second time and location, a security action to protect a user.

2. The computer-implemented method of claim 1, wherein the second light-and-radio frequency signature was captured by a different security device than the security device that captured the first light-and-radio frequency signature.

3. The computer-implemented method of claim 2, wherein the security device and the different security device are provided by the same cybersecurity vendor.

4. The computer-implemented method of claim 3, wherein the security device and the different security device correspond to different purchases from customers belonging to different households.

5. The computer-implemented method of claim 1, wherein the same security device captures both the first light-and-radio frequency signature and the second light-and-radio frequency signature.

6. The computer-implemented method of claim 5, wherein determining that the first light-and-radio frequency signature and the second light-and-radio frequency signature match comprises checking the first light-and-radio frequency signature against a database cache that is local to the security device.

7. The computer-implemented method of claim 1, wherein the first light-and-radio frequency signature or the second light-and-radio frequency signature is uploaded to a centralized data lake of signatures to share insights between customers of a same cybersecurity vendor.

8. The computer-implemented method of claim 1, further comprising prompting the user to indicate whether the individual possessing the mobile computing device is known to the user.

9. The computer-implemented method of claim 8, further comprising, upon a subsequent detection of the individual possessing the mobile computing device, alerting the user to the presence of the individual based on an indication that the individual is not known to the user.

10. The computer-implemented method of claim 1, further comprising the security device capturing evidence of a crime.

11. The computer-implemented method of claim 10, further comprising the security device submitting the evidence of the crime to law enforcement.

12. The computer-implemented method of claim 1, further comprising leveraging the first light-and-radio frequency signature and the second light-and-radio frequency signature to track movement of the individual possessing the mobile computing device across a local area.

13. The computer-implemented method of claim 1, wherein the first light-and-radio frequency signature is based at least in part on a Bluetooth advertisement or a Wi-Fi probe request.

14. The computer-implemented method of claim 1, wherein the first light-and-radio frequency signature is generated based on a combination of multiple underlying signatures across distinct wavelengths.

15. The computer-implemented method of claim 1, further comprising prompting the user with an option to enroll the first light-and-radio frequency signature to a centralized data lake maintained by a cybersecurity vendor that provided the security device such that cybersecurity insights associated with the first light-and-radio frequency signature are shared with other customers.

16. The computer-implemented method of claim 15, further comprising uploading the first light-and-radio frequency signature to the centralized data lake using a customized application programming interface.

17. The computer-implemented method of claim 1, further comprising sanitizing the first light-and-radio frequency signature in a manner that increases a level of privacy for the individual possessing the mobile computing device while nevertheless maintaining a level of cybersecurity protection.

18. The computer-implemented method of claim 17, wherein sanitizing the first light-and-radio frequency signature comprises limiting the first light-and-radio frequency signature to a textual tag in combination with information specifying captured electromagnetic emanations.

19. A system for protecting users, the system comprising:
an identification module, stored in memory, that:
   identifies a first light-and-radio frequency signature that was captured by a security device based on signals emanating from a mobile computing device at a first time and location; and
   identifies a second light-and-radio frequency signature that was captured by a same or different security device based on signals emanating from the same mobile computing device at a second time and location;
a determination module, stored in memory, that determines that the first light-and-radio frequency signature and the second light-and-radio frequency signature match such that an inference is made that an individual possessing the mobile computing device was present at both the first time and location and the second time and location;
a performance module, stored in memory, that performs, based on the inference that the individual possessing the mobile computing device was present at both the first time and location and the second time and location, a security action to protect a user; and
at least one physical processor configured to execute the identification module, the determination module, and the performance module.

20. A non-transitory computer-readable medium comprising one or more computer-readable instructions that, when executed by at least one processor of a computing device, cause the computing device to:
   identify a first light-and-radio frequency signature that was captured by a security device based on signals emanating from a mobile computing device at a first time and location;
   identify a second light-and-radio frequency signature that was captured by a same or different security device based on signals emanating from the same mobile computing device at a second time and location;
   determine that the first light-and-radio frequency signature and the second light-and-radio frequency signature match such that an inference is made that an individual possessing the mobile computing device was present at both the first time and location and the second time and location; and
   perform, based on the inference that the individual possessing the mobile computing device was present at both the first time and location and the second time and location, a security action to protect a user.

* * * * *